US012551271B2

(12) United States Patent
Govari et al.

(10) Patent No.: US 12,551,271 B2
(45) Date of Patent: Feb. 17, 2026

(54) BASKET CATHETER WITH CUSHIONING POROUS SHEATH COVER

(71) Applicant: Biosense Webster (Israel) Ltd., Yokneam (IL)

(72) Inventors: Assaf Govari, Haifa (IL); Christopher Thomas Beeckler, Brea, CA (US)

(73) Assignee: Biosense Webster (Israel) Ltd., Yokneam (IL)

(*) Notice: Subject to any disclaimer, the term of this patent is extended or adjusted under 35 U.S.C. 154(b) by 573 days.

(21) Appl. No.: 18/057,036

(22) Filed: Nov. 18, 2022

(65) Prior Publication Data

US 2023/0190365 A1 Jun. 22, 2023

Related U.S. Application Data

(60) Provisional application No. 63/291,301, filed on Dec. 17, 2021.

(51) Int. Cl.
*A61B 18/14* (2006.01)
*A61B 18/00* (2006.01)
*A61B 18/22* (2006.01)
*C08L 27/18* (2006.01)
(Continued)

(52) U.S. Cl.
CPC .......... *A61B 18/1492* (2013.01); *C08L 27/18* (2013.01); *C08L 67/06* (2013.01); *C08L 77/00* (2013.01); *A61B 2018/00065* (2013.01); *A61B 2018/00267* (2013.01); *A61B 2018/00351* (2013.01); *A61B 2018/00577* (2013.01);
(Continued)

(58) Field of Classification Search
CPC ...... A61B 18/1492; A61B 2018/00065; A61B 2018/00267; A61B 2018/00351; A61B 2018/00577; A61B 2018/00744; A61B 2018/2222; A61B 2218/002; C08L 27/18; C08L 67/06; C08L 77/00
See application file for complete search history.

(56) References Cited

U.S. PATENT DOCUMENTS

2013/0096550 A1 4/2013 Hill
2016/0199127 A1* 7/2016 Prutchi .............. A61B 18/1492
606/41
2019/0336208 A1* 11/2019 Asirvatham .......... A61B 18/02
(Continued)

FOREIGN PATENT DOCUMENTS

EP 4140429 A1 3/2023
WO 2022212849 A2 10/2022

OTHER PUBLICATIONS

Extended European Search Report dated May 12, 2023, from corresponding European Application No. 22214174.9.

*Primary Examiner* — Linda C Dvorak
*Assistant Examiner* — Abigail Bock

(57) ABSTRACT

A medical apparatus includes a shaft and a basket assembly. The shaft is configured for insertion into a cavity of an organ of a patient. The basket assembly is connected distally to the shaft and includes electrodes, which are configured to apply electrical energy to tissue within the cavity. The basket assembly further includes a flexible porous sheath, which is fitted over the basket assembly and is configured to contact the tissue within the cavity while simultaneously (i) preventing the electrodes from indenting the tissue and (ii) allowing electrical energy applied from the electrodes to be delivered to the tissue.

18 Claims, 2 Drawing Sheets

(51) Int. Cl.
*C08L 67/06* (2006.01)
*C08L 77/00* (2006.01)

(52) U.S. Cl.
CPC ............ *A61B 2018/00744* (2013.01); *A61B 2018/2222* (2013.01); *A61B 2218/002* (2013.01)

(56) References Cited

U.S. PATENT DOCUMENTS

| | | |
|---|---|---|
| 2020/0163707 A1 | 5/2020 | Sliwa et al. |
| 2020/0289197 A1 | 9/2020 | Viswanathan et al. |
| 2021/0038298 A1* | 2/2021 | Scott ................. A61B 18/1492 |
| 2021/0307815 A1 | 10/2021 | Govari et al. |

* cited by examiner

BASKET CATHETER WITH CUSHIONING POROUS SHEATH COVER

CROSS REFERENCE TO RELATED APPLICATIONS

This application claims benefit of priority to prior filed U.S. Provisional Patent Application No. 63/291,301 filed on Dec. 17, 2021 which is hereby incorporated by reference in full herein.

FIELD OF THE DISCLOSURE

The present disclosure relates generally to medical probes, and particularly to multi-electrode ablation catheters.

BACKGROUND OF THE DISCLOSURE

Cardiac arrythmias are commonly treated by ablation of myocardial tissue in order to block arrhythmogenic electrical pathways. For this purpose, a catheter is inserted through the patient's vascular system into a chamber of the heart, and an electrode or electrodes at the distal end of the catheter are brought into contact with the tissue that is to be ablated. In some cases, high-power radio-frequency (RF) electrical energy is applied to the electrodes in order to ablate the tissue thermally. Alternatively, high-voltage pulses may be applied to the electrodes in order to ablate the tissue by irreversible electroporation (IRE).

Some ablation procedures use basket catheters, in which multiple electrodes are arrayed along the splines of an expandable basket assembly at the distal end of the catheter. The splines bend outward to form a basket-like shape and contact tissue within a body cavity. For example, U.S. Patent Application Publication 2020/0289197 describes devices and methods for electroporation ablation therapy, with an example device including a set of splines coupled to a catheter for medical ablation therapy. Each spline of the set of splines may include a set of electrodes formed on that spline. The set of splines may be configured to transition between a first configuration and a second configuration.

U.S. Patent Application Publication 2020/0163707 describes a catheter comprising an expandable spline structure defining a distal tip portion of the catheter. The spline structure can include a plurality of individual splines, and each spline can be configured to support a plurality of energy transfer elements and/or temperature sensors. An expandable balloon configured to be associated with the spline structure is unattached to the spline structure along its length. Electrical operation through the walls of the balloon may occur before, during, or after cryoablation.

As another example, U.S. Patent Application Publication 2019/0336208 describes devices and methods for the treatment of heart conditions, hypertension, and other medical disorders. For example, this publication describes devices and methods for treating atrial fibrillation by performing thoracic vein ablation procedures, including pulmonary vein myocardium ablation. In some aspects, the ablation is performed in coordination with the delivery a pharmacological agent that can abate the formation of tissue stenosis or neointimal hyperplasia caused by the ablation.

SUMMARY

An example medical apparatus can include a shaft, a basket assembly, and a flexible porous sheath. The shaft can be configured for insertion into a cavity of an organ of a patient. The basket assembly can be connected distally to the shaft. The basket assembly can include electrodes, which are configured to apply electrical energy to tissue within the cavity. The flexible porous sheath can be fitted over the basket assembly and can be configured to contact the tissue within the cavity while simultaneously (i) preventing the electrodes from indenting the tissue and (ii) allowing electrical energy applied from the electrodes to be delivered to the tissue. The porous sheath can be inflated with an electrically conductive fluid to (i) prevent the electrodes from indenting the tissue and (ii) allow electrical energy applied from the electrodes to be delivered to the tissue. The pores of the porous sheath can irrigate the tissue. The electrically conductive fluid can be delivered through openings in splines of the basket assembly and/or through other irrigation channels to within the porous sheath.

An example method of using the medical apparatus can include inserting the basket assembly connected distally to the shaft into a cavity of an organ of a patient. Electrical energy can be applied to tissue within the cavity using the electrodes of the basket assembly. The flexible porous sheath can be inflated. The tissue within the cavity can be contacted using the flexible porous sheath, which is fitted over the basket assembly. The flexible porous sheath can simultaneously (i) prevent the electrodes from indenting the tissue and (ii) allow electrical energy applied from the electrodes to be delivered to the tissue. The size of the inflated sheath can be determined, at least in part by a pressure at which the porous sheath is inflated. The size of the inflated sheath in relation to the basket assembly can prevent electrodes of the basket assembly from applying force to tissue and/or reduce or spread force from electrodes to tissue.

BRIEF DESCRIPTION OF THE DRAWINGS

The present disclosure will be more fully understood from the following detailed description of the aspects thereof, taken together with the drawings in which.

DETAILED DESCRIPTION

Figure 1:
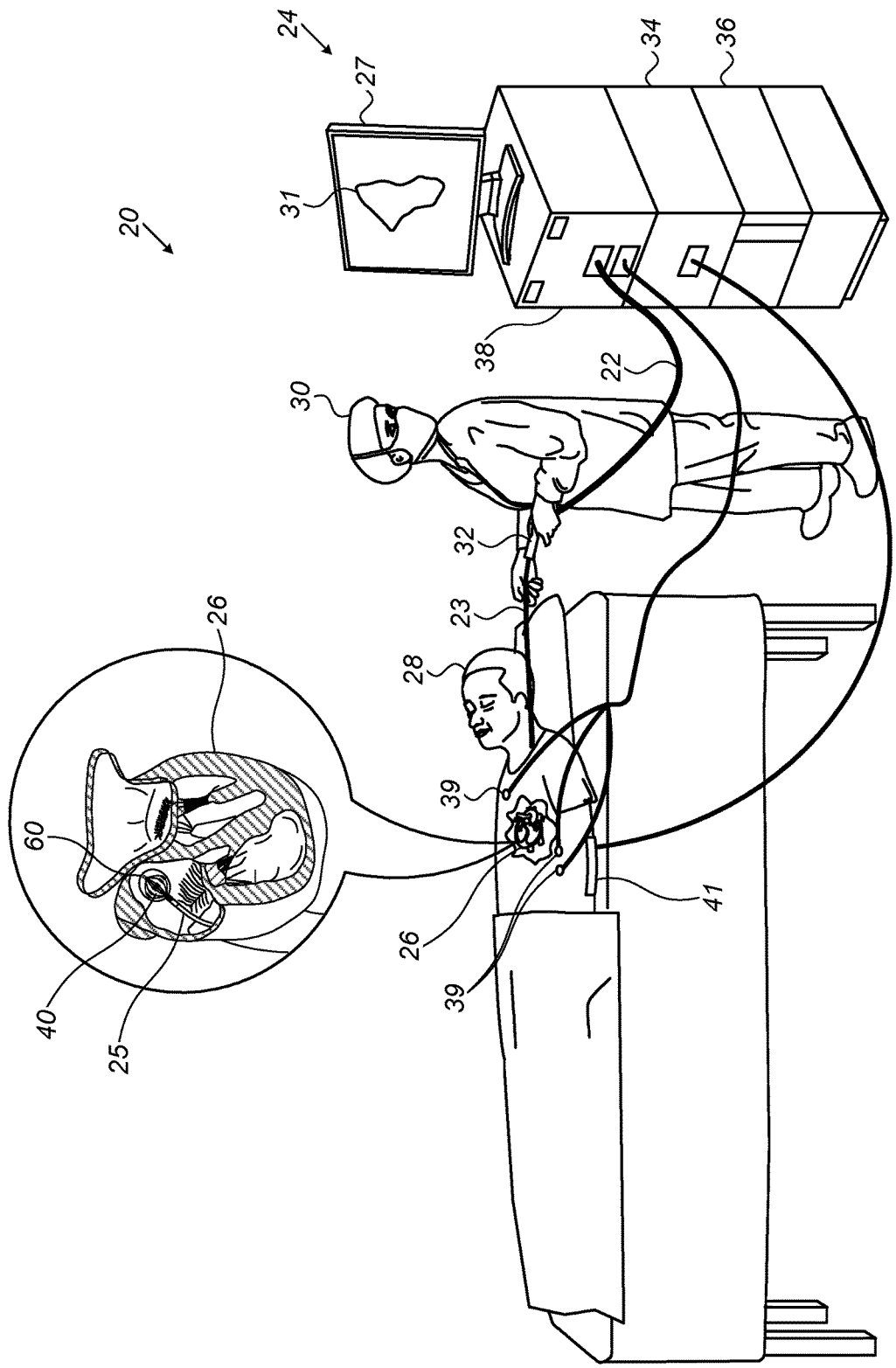
FIG. 1 is a schematic pictorial illustration of a catheter-based ablation system comprising a basket catheter including a cushioning porous sheath cover of a basket catheter assembly, in accordance with an aspect of the present disclosure.

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±10% of the recited value, e.g. "about 90%" may refer to the range of values from 81% to 99%.

As discussed herein, vasculature of a "patient," "host," "user," and "subject" can be vasculature of a human or any animal. It should be appreciated that an animal can be a variety of any applicable type, including, but not limited thereto, mammal, veterinarian animal, livestock animal or pet type animal, etc. As an example, the animal can be a laboratory animal specifically selected to have certain characteristics similar to a human (e.g., rat, dog, pig, monkey, or the like). It should be appreciated that the subject can be any applicable human patient, for example.

As discussed herein, "operator" and "user" can include a doctor, surgeon, technician, scientist, or any other individual or delivery instrumentation associated with delivery of a multi-electrode catheter for treatments disclosed herein.

As discussed herein, the terms "tubular" and "tube" are to be construed broadly and are not limited to a structure that is a right cylinder or strictly circumferential in cross-section or of a uniform cross-section throughout its length. For example, the tubular structures are generally illustrated as a substantially right cylindrical structure. However, the tubular structures may have a tapered or curved outer surface without departing from the scope of the present disclosure.

A multi-electrode cardiac catheter typically comprises a distal-end assembly disposed with multiple electrodes. For example, a basket catheter typically comprises an expandable frame of splines which is coupled to the distal end of a shaft for insertion into a cavity of an organ of a patient.

Basket catheters are useful in performing ablation procedures rapidly and efficiently, because the splines of the basket catheter (and thus the electrodes on the splines) are able to contact and ablate the tissue at multiple locations concurrently. The electrodes, however, can indent the tissue during the procedure, which can lead to local overheating, resulting in charring and/or other trauma. The use of electrodes having smooth, rounded profiles can be helpful in mitigating these effects, but by itself does not eliminate the problems of tissue damage.

Aspects of the present disclosure that are described herein address these problems by covering the basket assembly with a type of flexible porous sheath that keeps the electrodes from indenting tissue, while still permitting electrical energy to be applied from the electrodes through the sheath to the tissue.

In some aspects, to achieve this mechanical softening effect while at a same time maintaining efficacy of electrical ablation, the flexible porous sheath is inflated by irrigation of electricity conductive fluid (e.g., saline solution). The pressurized fluid increases the size of the sheath so that the porous sheath is somewhat larger than the enclosed basket, as described below. When the sheath contacts tissue (e.g., is pressed against tissue), it acts as a cushion. The cushion effect prevents, or mitigates to a substantial effect, an electrode from indenting the tissue. The porous sheath and the enclosed basket may be configured such that at least some of the electrodes on the enclosed basket do not apply any force to tissue. Additionally, or alternatively, the porous sheath and the enclosed basket may be configured such that at least some of the electrodes on the enclosed basket do apply a force to tissue, indirectly through the porous sheath, such that the force applied by the basket to tissue is substantially less than, and/or substantially spread across a larger surface area than would be the case if the electrodes were in direct contact with tissue (absent the porous sheath).

Typically, the inflated sheath is separated from at least some of the electrodes by a finite gap that is filled with electricity conductive fluid. The gap is typically a few millimeters at most. The size of the gap is typically chosen to be sufficient to reduce harmful indentation by the electrodes, while at the same time enabling sufficient energy transfer from the electrodes to the tissue. In other aspects, the flexible porous sheath can be made with some minimal thickness of its own so that that the porous sheath material itself (e.g., a soft, porous elastomer) provides some cushioning, while still being compressible in order to fit through a sheath.

In some aspects, the type of material and thickness of the porous sheath may be chosen so that irrigation fluid delivered through the catheter to the basket assembly can pass outward through the sheath to the tissue, while still preventing blood from penetrating inwards through the sheath from the body cavity (i.e., from a cavity of an organ). The sheath is thus further useful in preventing blood clots.

In some aspects, an electrical signal generator applies electrical energy to the electrodes on the basket assembly with an amplitude sufficient to ablate the tissue with electrodes in proximity but physically separated from tissue by the cover. In one aspect, the electrical signal generator applies bipolar electrical pulses to the electrodes with a sufficient amplitude so that the electrical energy applied from the electrodes through the sheath causes irreversible electroporation (IRE) in the tissue. Additionally or alternatively, the electrical signal generator applies a radio-frequency (RF) current to the electrodes with a power sufficient so that the electrical energy applied from the electrodes through the sheath causes thermal ablation of the tissue.

The disclosed technique can be used, mutatis mutandis, with other types of catheters applied for ablation, such as a multi-electrode lasso catheter assembly covered with a flexible porous sheath configured for inflation by irrigation. Although the aspects that are described hereinbelow relate specifically to a basket catheter for intracardiac ablation, the principles of the present disclosure may be adapted for use in other sorts of procedures in which electrical energy is applied to biological tissues.

FIG. 1 is a schematic pictorial illustration of a catheter-based ablation system 20 comprising basket catheter 22 including a cushioning porous sheath cover 60 of a basket assembly 40, in accordance with an aspect of the present disclosure. Elements of system 20 may be based on components of the CARTO® system, produced by Biosense Webster, Inc. (Irvine, California).

A physician 30 navigates a catheter 22 through the vascular system of a patient 28 into a chamber of a heart 26 of the patient, and then deploys a basket assembly 40, over which a flexible porous sheath 60 is fitted at the distal end of the catheter 22. The proximal end of basket assembly 40 is connected to the distal end of a shaft 25, which physician 30 steers using a manipulator 32 near the proximal end of catheter 22. Basket assembly 40 is inserted in a collapsed configuration through a tubular sheath 23, which passes through the vascular system of patient 28 into the heart chamber where the ablation procedure is to be performed. Once inserted into the heart chamber, basket assembly 40 is deployed from the tubular sheath and allowed to expand within the chamber. Catheter 22 is connected at its proximal end to a control console 24. A display 27 on console 24 may present a map 31 or other image of the heart chamber with an icon showing the location of basket assembly 40 in order to assist physician 30 in positioning the basket assembly at the target location for the ablation procedure.

Once basket assembly 40 is properly deployed and positioned in heart 26, physician 30 actuates an electrical signal generator 38 in console 24 to apply electrical energy (such as IRE pulses or RF waveforms) to the electrodes on the basket assembly, under the control of a processor 36. The electrical energy may be applied in a bipolar mode between pairs of the electrodes on basket assembly 40, or in a unipolar mode between the electrodes on basket assembly 40 and a separate common electrode, for example a conductive back patch 41, which is applied to the patient's skin. During the ablation procedure, an irrigation pump 34 delivers an irrigation fluid, such as saline solution, through shaft 25 to basket assembly 40.

Typically, catheter 22 comprises one or more position sensors (not shown in the figures), which output position signals that are indicative of the position (location and orientation) of basket assembly 40. For example, basket assembly 40 may incorporate one or more magnetic sensors which output electrical signals in response to an applied magnetic field. Processor 36 receives and processes the signals in order to find the location and orientation coordinates of basket assembly 40, using techniques that are known in the art and are implemented, for example, in the above-mentioned Carto system. Alternatively or additionally, system 20 may apply other position-sensing technologies in order to find the coordinates of basket assembly 40. For example, processor 36 may sense the impedances between the electrodes on basket assembly 40 and body-surface electrodes 39, which are applied to the chest of patient 28, and may convert the impedances into location coordinates using techniques that are likewise known in the art. In any case, processor 36 uses the coordinates in displaying the location of basket assembly 40 on map 31.

Alternatively, catheter 22 and the ablation techniques that are described herein may be used without the benefit of position sensing. In such aspects, for example, fluoroscopy and/or other imaging techniques may be used to ascertain the location of basket assembly 40 in heart 26.

The system configuration that is shown in FIG. 1 is presented by way of example for conceptual clarity in understanding the operation of aspects of the present disclosure. For the sake of simplicity, FIG. 1 shows only the elements of system 20 that are specifically related to basket assembly 40 and ablation procedures using the basket assembly. The remaining elements of the system will be apparent to those skilled in the art, who will likewise understand that the principles of the present disclosure may be implemented in other medical therapeutic systems, using other components. All such alternative implementations are considered to be within the scope of the present disclosure.

Figure 2:
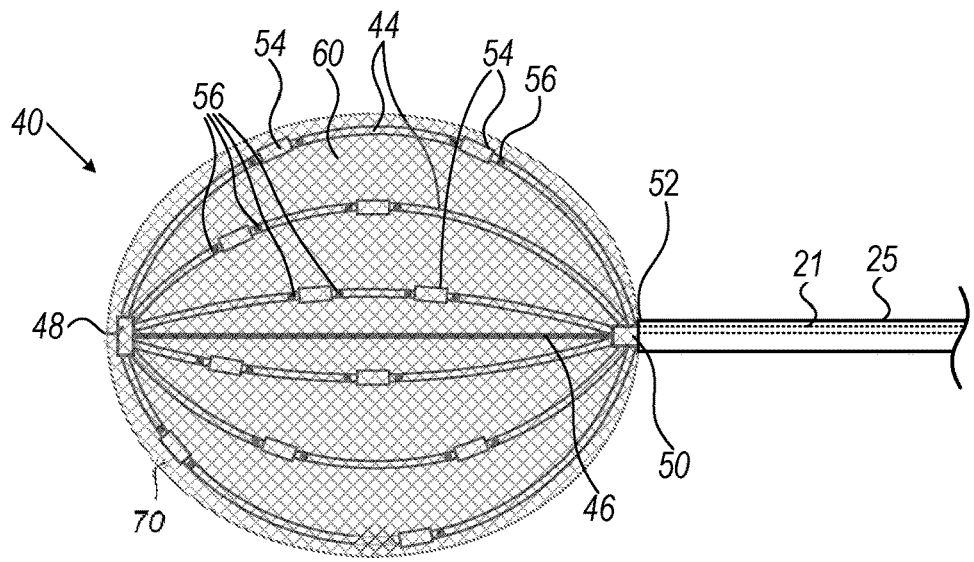
FIG. 2 is a schematic side view of the basket assembly of FIG. 1 with the cushioning porous sheath cover, in accordance with an aspect of the disclosure.

FIG. 2 is a schematic side view of the basket assembly 40 of FIG. 1 with cushioning porous sheath cover 60, in accordance with an aspect of the disclosure. Basket assembly 40 is seen in its expanded state, with flexible, porous sheath 60 in its inflated state obtained by pressurized irrigation fluid conveyed via a channel 21 in shaft 25.

As seen, basket assembly 40 has a distal end 48 and a proximal end 50, which is connected to a distal end 52 of shaft 25. The basket assembly 40 comprises multiple splines 44, whose proximal ends are conjoined at proximal end 50 of the basket assembly 40, and whose distal ends are conjoined at distal end 48 of the basket assembly 40. One or more electrodes 54 are disposed externally on each of splines 44. Alternatively, splines 44 may comprise a solid conducting material and may thus serve as electrodes themselves, for example as described in U.S. patent application Ser. No. 16/842,648, filed Apr. 7, 2020, published as U.S. Patent Publication No. 2021/0307815 which is incorporated by reference herein to this application.

Irrigation outlets 56 in splines 44 allow irrigation fluid flowing within the splines to exit and irrigate tissue in the vicinity of electrodes 54. Alternatively or additionally, the irrigation outlets may be located elsewhere in the basket assembly, for example on an irrigation manifold that is contained inside the basket assembly (not shown in the figures).

In the shown expanded state, splines 44 bow radially outward, causing porous sheath 60 to expand and, after being further inflated by irrigation, contact tissue within the heart. As seen, flexible sheath 60 is fitted over basket assembly 40 and thus contacts the tissue in heart 26 when the basket assembly is expanded and advanced against the tissue. Thus, sheath 60 prevents direct mechanical contact between electrodes 54 and the heart tissue that may cause the undesired indentation. As seen, the flexible porous sheath and at least one of the electrodes have a finite fluid-filled gap 70 therebetween.

Still, the electrical energy that is applied to electrodes 54 passes through sheath 60 to the tissue. In one aspect, sheath 60 comprises expanded polytetrafluoroethylene (ePTFE), for example with a thickness of about 70 μm. The pores in the ePTFE, are sufficiently large to permit the irrigation fluid to pass from irrigation outlets 56 outward through sheath 60 to irrigate the heart tissue, while preventing blood from penetrating inward through the sheath from the heart chamber. The ePTFE sheath is also advantageous in being lubricious, smooth, strong, biocompatible and, by being inflated, preventing electrodes 54 from indenting the heart tissue. In certain embodiments, the porous sheath may have pores with respective areas between 10 μm$^2$ and 100,000 μm$^2$. Alternatively, the respective areas of the pores are between 100 μm$^2$ and 10,000 μm$^2$.

Alternatively, sheath 60 comprises a tube made by braiding suitable polymer fibers, such as a polyethylene terephthalate (PET) yarn, polyamide yarn, yarn of any other suitable material, blended yarns, or combinations of yarn types. The tube may be braided with a variable diameter so as to better conform to the deployed basket shape. Specifically, the proximal diameter of the tube may be made to fit the proximal neck of a basket, and the distal diameter may be made as small as possible. The distal end may be closed by fastening the loose yarn ends with an adhesive, melting the yarn ends together, or any other suitable sealing method. An advantage of utilizing a fabric in a tubular shape rather than a flat shape is that the material better conforms to the basket shape, and pleats are avoided or minimized Avoidance of pleats is helpful in reducing the collapsed diameter of sheath 60 and also reduces the potential for blood to coagulate in the folds of the material.

The porous sheath 60 can include a polymer fiber portion having at least one of a hydrophilic coating or a hydrophobic coating. A given polymer fiber portion can have only one of a hydrophilic coating or a hydrophobic coating. A given polymer fiber portion can have both a hydrophilic coating and a hydrophobic coating; for instance, an outer or inner surface of a polymer fiber portion can have a hydrophobic coating and the opposite surface can have a hydrophilic coating.

In the collapsed state (not shown), splines 44 are straight and aligned parallel to a longitudinal axis of shaft 25 to facilitate insertion of basket assembly 40 into heart 26. In this state, flexible sheath 60 collapses inward together with the splines.

In one aspect, splines 44 are produced such that the stable state of basket assembly 40 is the collapsed state. In this case, when basket assembly 40 is pushed out of the sheath, it is expanded by drawing a puller wire (not shown) in the proximal direction through shaft 25. Releasing puller wire (not shown) allows basket assembly 40 to return to its collapsed state.

In another aspect, splines 44 are produced such that the stable state of basket assembly 40 is the expanded state of FIG. 2. In this case, basket assembly 40 opens out into the expanded state when it is pushed out of the sheath, and the puller wire may be replaced by a flexible pusher rod 46 for straightening splines 44 before withdrawing the basket assembly back into the sheath.

The basket, without the porous sheath 70, may have its outermost diameter (typically measured at the equatorial region of the basket from the longitudinal axis referenced as 46) being the same or slightly smaller than the largest inside diameter of the fully inflated porous sheath cover. In some embodiments, the largest outside diameter of basket is any value from approximately 80% to 95% of the inside diameter of a fully inflated porous sheath 70.

It will be appreciated that the aspects described above are cited by way of example, and that the present disclosure is not limited to what has been particularly shown and described hereinabove. Rather, the scope of the present disclosure includes both combinations and subcombinations of the various features described hereinabove, as well as variations and modifications thereof which would occur to persons skilled in the art upon reading the foregoing description and which are not disclosed in the prior art.

Figure 3:
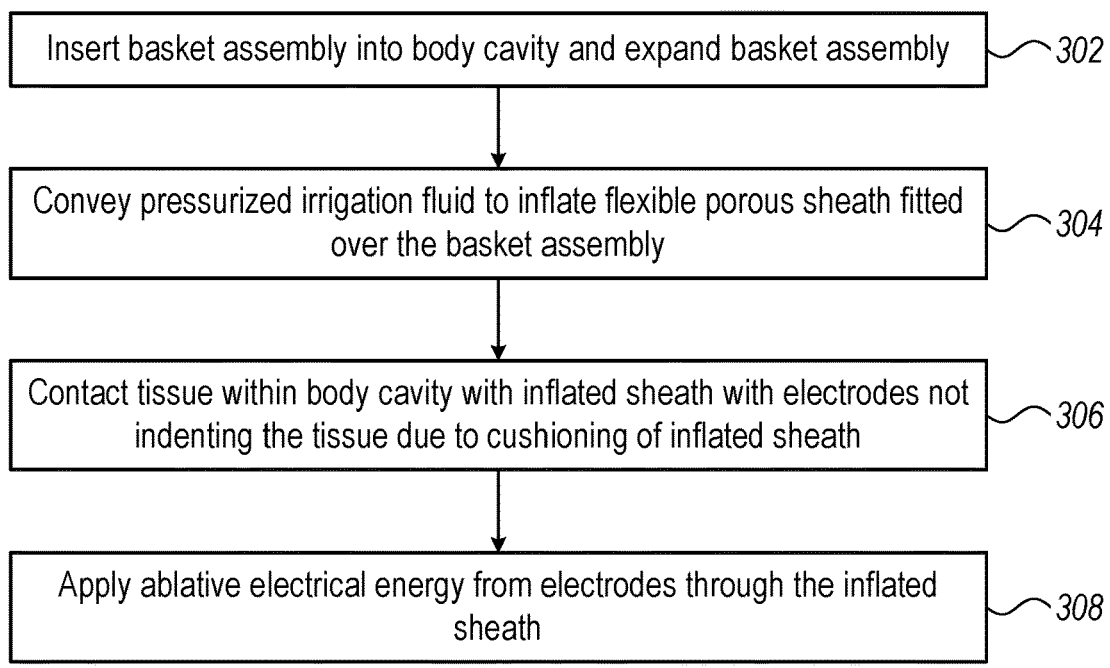
FIG. 3 is a flow chart that schematically illustrates a method for ablating tissue with the catheter of FIG. 1, in accordance with an aspect of the present disclosure.

FIG. 3 is a flow chart that schematically illustrates a method for ablating tissue with the catheter assembly of FIG. 1, in accordance with an aspect of the present disclosure. The process begins with physician 30 inserting a basket catheter into a cavity of heart 26 and expanding basket assembly 40 at a target location inside the cardiac cavity, at a basket catheter assembly positioning step 302.

Next, physician 30 commands system 20 to apply irrigation so as to inflate flexible porous sheath 60 into the aforementioned form that enables ablation without direct physical contact of electrodes 54 with ablated tissue, at a sheath inflation step 304.

At contacting tissue step 306, physician 30 brings at least a portion (e.g., a subset) of functional electrodes 54 into planned proximity with tissue, e.g., over an entire lateral circumference of assembly 40. The physician achieves this by bringing the inflated porous sheath 60 into full contact with tissue. For example, the physician may distally press the inflated porous sheath 60 against an ostium of a pulmonary vein to subsequently perform pulmonary vein isolation to treat an arrhythmia. As sheath cover 60 is pressed, the distal electrodes 54 portion of electrodes is brought close enough to ostium tissue, but without risk of these distal electrodes indenting the ostium tissue.

Finally, after the catheter is positioned and pressed against tissue, the physician performs the electrical ablation, at tissue ablation step 308.

The example flow chart shown in FIG. 3 is chosen purely for the sake of conceptual clarity. The present aspect also comprises additional steps, such as acquiring intra-cardiac electrocardiograms, which have been omitted from the disclosure herein purposely in order to provide a more simplified flow chart. In addition, other possible steps, such as temperature measurements and measuring contact force, are omitted for clarity of presentation.

Example 1

A medical apparatus including a shaft (25) and a basket assembly (40). The shaft is configured for insertion into a cavity of an organ of a patient. The basket assembly is connected distally to the shaft (25) and includes electrodes (54), which are configured to apply electrical energy to tissue within the cavity. The basket assembly further includes a flexible porous sheath (60), which is fitted over the basket assembly and is configured to contact the tissue within the cavity while simultaneously (i) preventing the electrodes from indenting the tissue and (ii) allowing electrical energy applied from the electrodes to be delivered to the tissue.

Example 2

The apparatus according to example 1, wherein the flexible porous sheath (60) is configured to be inflated with pressurized fluid, so as to prevent the electrodes from indenting the tissue.

Example 3

The apparatus according to examples 1 or 2, wherein the apparatus further includes a pump (34), which is coupled to supply the fluid to a channel in the shaft for inflating the flexible porous sheath (60).

Example 4

The apparatus according to any of examples 1 through 3, wherein the basket assembly comprises one or more irrigation outlets (56), which are coupled to convey irrigation fluid from the shaft to the tissue through the porous sheath (60).

Example 5

The apparatus according to example 1, wherein the flexible porous sheath (60) and at least one of the electrodes have a finite fluid-filled gap (70) therebetween.

Example 6

The apparatus according to any of examples 1 through 5, wherein the flexible porous sheath (60) has a minimal given thickness that is configured to prevent the electrodes from indenting the tissue.

Example 7

The apparatus according to any of examples 1 through 6, wherein the porous sheath (60) comprises one of expanded polytetrafluoroethylene (ePTFE), a braided polymer fiber comprising polyethylene terephthalate (PET), or a braided polymer fiber comprising polyamide.

Example 8

The apparatus according to any of examples 1 through 7, wherein the porous sheath (60) comprises braided as a tube of varying diameter.

Example 9

The apparatus according to any of examples 1 through 8, wherein the porous sheath (60) comprises a polymer fiber portion having at least one of a hydrophilic coating or a hydrophobic coating.

Example 10

The apparatus according to any of examples 1 through 9, wherein the porous sheath (60) comprises a fabric configured to permit irrigation fluid to pass outward through the sheath from one or more irrigation outlets to the tissue while preventing blood from penetrating inward through the sheath from the cavity.

Example 11

The apparatus according to any of examples 1 through 10, wherein the basket assembly (40) comprises a plurality of resilient splines (44), having respective proximal and distal tips, wherein the proximal tips of the splines are joined mechanically at a proximal end (50) of the basket assembly, and the distal tips of the splines are joined mechanically at a distal end (48) of the basket assembly (40), and the splines bow radially outward when the basket assembly is deployed in the cavity, thereby causing the sheath to contact the tissue in the cavity.

Example 12

The apparatus according to any of examples 1 through 11, wherein the apparatus further includes an electrical signal generator configured to apply electrical energy to the electrodes with an amplitude sufficient to ablate the tissue.

Example 13

A medical method including inserting a basket assembly (40) connected distally to a shaft (25) into a cavity of an organ of a patient. Electrical energy is applied to tissue within the cavity using electrodes (54) comprised in the basket assembly. The tissue within the cavity is contacted using a flexible porous sheath (60), which is fitted over the basket assembly and is configured to simultaneously (i) prevent the electrodes from indenting the tissue and (ii) allow electrical energy applied from the electrodes to be delivered to the tissue.

Example 14

A method for producing a medical probe, the method including producing a basket assembly (40) including (a) electrodes (54), which are configured to apply electrical energy to tissue within the cavity, and (b) a flexible porous sheath (60), which is fitted over the basket assembly (40) and is configured to contact the tissue within the cavity while simultaneously (i) preventing the electrodes from indenting the tissue and (ii) allowing electrical energy applied from the electrodes to be delivered to the tissue. The basket assembly is connected to a shaft configured for insertion into a cavity of an organ of a patient.

Although the aspects described herein mainly address cardiac applications, the methods and systems described herein can also be used in other catheter-based applications, such as in performing ablation inside other organs, e.g., inside a bladder or in the renal artery outside of the kidney.

It will thus be appreciated that the aspects described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A medical apparatus, comprising: a shaft configured for insertion into a cavity of an organ of a patient; a basket assembly connected distally to the shaft and comprising electrodes, which are configured to apply electrical energy to tissue within the cavity; and a flexible porous sheath, which is fitted over the basket assembly and is configured to contact the tissue within the cavity while simultaneously (i) preventing the electrodes from indenting the tissue and (ii) allowing electrical energy applied from the electrodes to be delivered to the tissue, the flexible porous sheath comprising a minimal given thickness that is configured to provide cushioning to prevent the electrodes from indenting the tissue.

2. The medical apparatus according to claim 1, wherein the flexible porous sheath is configured to be inflated with pressurized fluid, so as to prevent the electrodes from indenting the tissue.

3. The medical apparatus according to claim 2, and comprising a pump, which is coupled to supply the pressurized fluid to a channel in the shaft for inflating the flexible porous sheath.

4. The medical apparatus according to claim 1, wherein the basket assembly comprises one or more irrigation outlets, which are coupled to convey irrigation fluid from the shaft to the tissue through the flexible porous sheath.

5. The medical apparatus according to claim 1, wherein the flexible porous sheath and at least one of the electrodes have a finite fluid-filled gap therebetween when the flexible porous sheath is inflated with fluid in an unconstrained configuration.

6. The medical apparatus according to claim 1, wherein the flexible porous sheath comprises one of expanded polytetrafluoroethylene (ePTFE), a braided polymer fiber comprising polyethylene terephthalate (PET), or a braided polymer fiber comprising polyamide.

7. The medical apparatus according to claim 1, wherein the flexible porous sheath is formed as a braided tube comprising a varying diameter.

8. The medical apparatus according to claim 1, wherein the flexible porous sheath comprises a polymer fiber portion having at least one of a hydrophilic coating or a hydrophobic coating.

9. The medical apparatus according to claim 1, wherein the flexible porous sheath comprises a fabric configured to permit irrigation fluid to pass outward through the flexible porous sheath from one or more irrigation outlets to the tissue while preventing blood from penetrating inward through the flexible porous sheath from the cavity.

10. The medical apparatus according to claim 1, wherein the basket assembly comprises a plurality of resilient splines, having respective proximal and distal tips, wherein the proximal tips of the resilient splines are joined mechanically at a proximal end of the basket assembly, and the distal tips of the resilient splines are joined mechanically at a distal end of the basket assembly, and the resilient splines bow radially outward when the basket assembly is deployed in the cavity, thereby causing the flexible porous sheath to contact the tissue in the cavity.

11. The medical apparatus according to claim 1, and comprising an electrical signal generator configured to apply electrical energy to the electrodes with an amplitude sufficient to ablate the tissue.

12. A medical method, comprising: inserting a basket assembly connected distally to a shaft into a cavity of an organ of a patient; applying electrical energy to tissue within the cavity using electrodes comprised in the basket assembly; and contacting the tissue within the cavity using a flexible porous sheath, which is fitted over the basket assembly and is configured to simultaneously (i) prevent the electrodes from indenting the tissue and (ii) allow electrical energy applied from the electrodes to be delivered to the tissue, the flexible porous sheath comprising a minimal given thickness that is configured to provide cushioning to prevent the electrodes from indenting the tissue.

13. The medical method according to claim 12, further comprising:
preventing the electrodes from indenting the tissue, by inflating the flexible porous sheath with pressurized fluid.

14. A method for producing a medical probe, the method comprising: producing a basket assembly, comprising: electrodes, which are configured to apply electrical energy to tissue within a cavity; and a flexible porous sheath, which is fitted over the basket assembly and is configured to contact the tissue within the cavity while simultaneously (i) preventing the electrodes from indenting the tissue and (ii) allowing electrical energy applied from the electrodes to be delivered to the tissue, and connecting the basket assembly to a shaft configured for insertion into the cavity of an organ of a patient, the flexible porous sheath comprising a minimal thickness that is configured to provide cushioning to prevent the electrodes from indenting the tissue.

15. The method according to claim 14, wherein the flexible porous sheath is configured to be inflated with pressurized fluid, so as to prevent the electrodes from indenting the tissue.

16. The method according to claim 15, wherein the medical probe is further configured to be coupled to a pump, to supply the pressurized fluid to a channel in the shaft for inflating the flexible porous sheath.

17. The method according to claim 14, wherein producing the basket assembly comprises producing one or more irrigation outlets, which are coupled to convey irrigation fluid from the shaft to the tissue through the flexible porous sheath.

18. The method according to claim 14, wherein the flexible porous sheath and at least one of the electrodes have a finite fluid-filled gap therebetween when the flexible porous sheath is inflated with fluid in an unconstrained configuration.

* * * * *